US010532911B2

(12) United States Patent
Rodriguez

(10) Patent No.: US 10,532,911 B2
(45) Date of Patent: Jan. 14, 2020

(54) MOTOR DRIVE HAVING DUAL INVERTER SYSTEM CONNECTED TO FIRST AND SECOND STATOR SECTIONS

(71) Applicant: Otis Elevator Company, Farmington, CT (US)

(72) Inventor: Fernando Rodriguez, Manchester, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 706 days.

(21) Appl. No.: 15/100,766

(22) PCT Filed: Dec. 5, 2013

(86) PCT No.: PCT/US2013/073300
§ 371 (c)(1),
(2) Date: Jun. 1, 2016

(87) PCT Pub. No.: WO2015/084365
PCT Pub. Date: Jun. 11, 2015

(65) Prior Publication Data
US 2016/0311656 A1 Oct. 27, 2016

(51) Int. Cl.
*B66B 1/06* (2006.01)
*B66B 11/04* (2006.01)
(Continued)

(52) U.S. Cl.
CPC ............ *B66B 11/0407* (2013.01); *B66B 1/30* (2013.01); *B66B 19/00* (2013.01); *B66B 9/003* (2013.01)

(58) Field of Classification Search
CPC ......... B66B 11/0407; B66B 1/30; B66B 9/02; B66B 19/00; B66B 9/003
USPC ....... 187/247, 277, 289, 290, 293, 296, 297, 187/391, 393; 318/135, 687, 799, 318/800–815; 104/281–283, 290;
(Continued)

(56) References Cited

U.S. PATENT DOCUMENTS 4,723,103 A * 2/1988 Gilgen .................. B60L 15/005
104/290
4,808,901 A * 2/1989 Sakamoto ................ G11B 7/08
318/135
(Continued)

FOREIGN PATENT DOCUMENTS

CN 1120799 C 9/2003
CN 101016135 A 8/2007
(Continued)

OTHER PUBLICATIONS

International Search Report for application PCT/US2013/073300, dated Sep. 1, 2014, 15 pages.
(Continued)

*Primary Examiner* — Anthony J Salata
(74) *Attorney, Agent, or Firm* — Cantor Colburn LLP

(57) ABSTRACT

A linear propulsion system and method of assembling and testing the same. The linear propulsion system may comprise a track, a vehicle, a mover mounted to the vehicle, and a dual inverter system. The track may include a first plurality of stator sections interleaved with a second plurality of stator sections. The dual inverter system may include first and second multi-phase inverters (52*a*, 52*b*) that share input hardware.

19 Claims, 6 Drawing Sheets

(51) Int. Cl.

| | |
|---|---|
| ***B66B 1/30*** | (2006.01) |
| ***B66B 19/00*** | (2006.01) |
| *B66B 9/00* | (2006.01) |

(58) Field of Classification Search
USPC ......... 310/12.01, 12.04, 12.09, 12.11, 12.15; 363/34, 37, 40
See application file for complete search history.

(56) References Cited

U.S. PATENT DOCUMENTS

| | | | | | |
|---|---|---|---|---|---|
| 5,136,217 | A * | 8/1992 | Hoffmann | B60L 15/005 | 318/135 |
| 5,288,956 | A * | 2/1994 | Kadokura | B66B 11/0407 | 187/250 |
| 5,400,204 | A * | 3/1995 | Oshima | B66B 5/0031 | 187/277 |
| 5,542,501 | A * | 8/1996 | Ikejima | B66B 1/30 | 187/289 |
| 6,305,501 | B1 * | 10/2001 | Kahkipuro | B66B 11/0407 | 187/250 |
| 6,515,878 | B1 * | 2/2003 | Meins | B60L 5/005 | 363/37 |
| 7,019,421 | B1 * | 3/2006 | Hall | B66B 11/0407 | 310/12.11 |
| 7,394,672 | B2 * | 7/2008 | Engel | B60L 13/03 | 363/34 |
| 8,008,885 | B2 * | 8/2011 | Jones | B63H 21/17 | 318/800 |
| 8,096,387 | B2 * | 1/2012 | Kattainen | B66B 1/30 | 187/248 |
| 8,171,858 | B2 * | 5/2012 | Wamble, III | B60L 13/04 | 104/281 |
| 8,314,578 | B2 | 11/2012 | Namuduri et al. | | |
| 9,884,744 | B2 * | 2/2018 | Witczak | B66B 11/04 | |
| 9,926,172 | B2 * | 3/2018 | Fargo | B66B 11/0407 | |
| 10,059,563 | B2 * | 8/2018 | Agirman | B66B 1/302 | |
| 10,087,044 | B2 * | 10/2018 | Fargo | B66B 1/285 | |
| 10,118,799 | B2 * | 11/2018 | Piech | B66B 9/003 | |
| 2018/0022576 | A1 * | 1/2018 | Jiang | H02P 7/08 | 187/297 |

FOREIGN PATENT DOCUMENTS

| | | | |
|---|---|---|---|
| CN | 101830223 | A | 9/2010 |
| CN | 103420260 | A | 12/2013 |
| EP | 0048847 | A1 | 4/1982 |
| JP | H05213544 | A | 8/1993 |
| JP | H06144720 | A | 5/1994 |
| JP | H06263366 | A | 9/1994 |
| JP | H0781863 | A | 3/1995 |
| JP | 2002101682 | A | 4/2002 |
| WO | 2008005428 | A2 | 1/2008 |

OTHER PUBLICATIONS

Chinese First Office Action and Search Report for application CN 201380082017.X, dated Jul. 20, 2017, 10 pgs.
European Search Report for application EP 13898797.9, dated Aug. 16, 2017, 10pgs.

* cited by examiner

MOTOR DRIVE HAVING DUAL INVERTER SYSTEM CONNECTED TO FIRST AND SECOND STATOR SECTIONS

FIELD OF THE DISCLOSURE

The present disclosure generally relates to drive systems, and, in particular, relates to drive systems utilized with linear machines with distributed windings.

BACKGROUND OF THE DISCLOSURE

Linear propulsion electric machines may be used to propel vehicles or the like in a wide variety of applications. In general, linear propulsion of vehicles may be achieved with a linear electric machine whose stator spans the length of the path or track that the vehicle travels. In such applications, the mover is typically mounted on the vehicle. The stator interacts with the mover mounted on the vehicle to propel the vehicle along the track. The stator may include of a series of coils which line the track. One way of powering those coils is by machine power-electronic inverters.

"Japan's superconducting Maglev train," *Instrumentation & Measurement Magazine*, IEEE , vol.5, no.1, pp.9-15, March 2002, authored by M. Ono, S. Koga and H. Ohtsuki, H. describes the linear propulsion system of the Maglev train. In the disclosed application, three separate inverters are utilized to power various stator segments of the train track. Every other stator segment of the track is powered by a different inverter. As the train travels along its route, it travels along a stator segment powered by a first inverter, then along a stator segment powered by a second inverter and then along a stator segment powered by a third inverter. The scenario repeats for the entire length of the track. A handoff must be coordinated between each separate inverter and its input hardware. Such a design may increase the likelihood of position signal latency complicating propulsion of the vehicle during the transition from one inverter to another. A better design is desired.

SUMMARY OF THE DISCLOSURE

In accordance with one aspect of the disclosure, a linear propulsion system is disclosed. The linear propulsion system may comprise a track, a vehicle, a mover functionally mounted to the vehicle and disposed adjacent to the track, and a dual inverter system. The track may comprise a first plurality of stator sections and a second plurality of stator sections. The second plurality may be interleaved between the first plurality of stator sections. Each stator section may include a frame and a plurality of coils mounted on the frame. Each stator section has an activated state and a deactivated state. A propulsion force on the vehicle is generated when the mover is adjacent to one or more of the stator sections in the activated state. The mover may include a plurality of magnets. The dual inverter system is operably connected to each of the stator sections. In an embodiment, the dual inverter system may include first and second multi-phase inverters, and a controller. The first inverter is operably connected to the first plurality of stator sections, and the second inverter is operably connected to the second plurality of stator sections. The controller may be operably connected to the first and second multi-phase inverters.

In one embodiment, the length of the mover may be about the same or shorter than the stator section. In another embodiment, the mover may include permanent magnets.

In some embodiments, the stator section may include a plurality of subsections arranged consecutively. Each subsection may include a plurality of coils. In some embodiments, the length of the mover may be longer than each subsection but shorter than the stator section.

In an embodiment, the dual inverter system may further include input hardware shared by and operably connected to the first and second multi-phase inverters. In a refinement, the input hardware may include a filter. In another refinement, the input hardware may include a pre-charge circuit that limits the initial current received by the first and second inverters from a power source. In yet another refinement, the input hardware may include an AC to DC converter. In another refinement, the input hardware may include a DC-link capacitor.

In accordance with another aspect of the disclosure, a method of assembling and testing a linear propulsion system is disclosed. The method may comprise providing a track, a vehicle, a mover, and a dual inverter system. The track includes a first plurality of stator sections and a second plurality of stator sections. In an embodiment, the second plurality may be interleaved between the first plurality. Each stator section may include a frame and a plurality of coils functionally mounted to the frame. Each stator section has an activated state and a deactivated state. The mover may be mounted on the vehicle and disposed adjacent to the track. The mover may include a plurality of magnets. The dual inverter system is operably connected to each of the stator sections. The dual inverter system may include a controller and first and second multi-phase inverters that share input hardware operably connected to each of the first and second multi-phase inverters. The first inverter may be operably connected to the first plurality of stator sections, and the second inverter may be operably connected to the second plurality of stator sections.

The method may further comprise sharing input hardware by the first and second multi-phase inverters, receiving, by the first multi-phase inverter, power input from the common input hardware, receiving, by the second multi-phase inverter, power input from the common input hardware, sequencing, by the controller, the activation and deactivation signals to the first and second multi-phase inverters to activate a first stator section of the first plurality of stator sections followed by activating a second stator section of the second plurality of stator sections, the second stator section sequentially adjacent to the first stator section, and generating a propulsion force on the vehicle in a direction along the track when the first and second stator sections are activated.

In accordance with yet another aspect of the disclosure, an elevator system is disclosed. The elevator system may comprise a track, a car, a mover functionally mounted to the car, and a dual inverter system. The track may comprise a plurality of segments. Each segment may service a plurality of floors in a building. Each segment includes a first plurality of stator sections and a second plurality of stator sections. The second plurality may be interleaved with the first plurality of stator sections. Each stator section may include a plurality of coils. Each stator section has an activated state and a deactivated state. When the first inverter is activated, a first stator section in the first plurality is energized and the interaction between the mover and the first stator section generates a propulsion force on the car in a vertical direction, and when the second inverter is activated, a second stator section in the second plurality is energized and the interaction between the mover and the second stator section generates a propulsion force on the car in a vertical direction.

The mover is functionally mounted to the car and disposed adjacent to the track. The mover may include a plurality of magnets.

The dual inverter system is operably connected to one of the segments. The dual inverter system may include first and second multi-phase inverters, input hardware disposed between a power source and each of the first and second multi-phase inverters, and a controller operably connected to the first and second multi-phase inverters.

The first inverter may be operably connected to the first plurality of stator sections. The second inverter may be operably connected to the second plurality of stator sections. The input hardware may be shared by the first and second multi-phase inverters.

In an embodiment, during propulsion of the car in a segment, the hardware utilization of the input hardware may be in the range of about 95% to 100%. In another embodiment, each stator section may include subsections, wherein a length of the mover may be longer than each individual subsection. In another embodiment, the input hardware may include sensor. In yet another embodiment, when power is received from the first multi-phase inverter, a first stator section of the first plurality is activated but none of the second plurality of stators sections is activated. In yet another embodiment, when power is received from the second multi-phase inverter, a second stator section of the second plurality is activated but none of the first plurality of stator sections is activated.

In an embodiment, the elevator system may further comprise a plurality of switches in a one-to-one correspondence with each of the stator sections. Each switch may be disposed between the dual inverter system and one of the stator sections. Each switch may be moveable between an open position and a closed position. In an embodiment, when the switch is in the closed position, the stator section is activated.

In another embodiment, the mover may include permanent magnets. In another embodiment, the length of the mover is the same or shorter than each stator section. In yet another embodiment, each stator section may comprise three subsections.

These and other aspects of this disclosure will become more readily apparent upon reading the following detailed description when taken in conjunction with the accompanying drawings. Although various features are disclosed in relation to specific exemplary embodiments, it is understood that the various features may be combined with each other, or used alone, with any of the various exemplary embodiments without departing from the scope of the disclosure.

Figure 1:
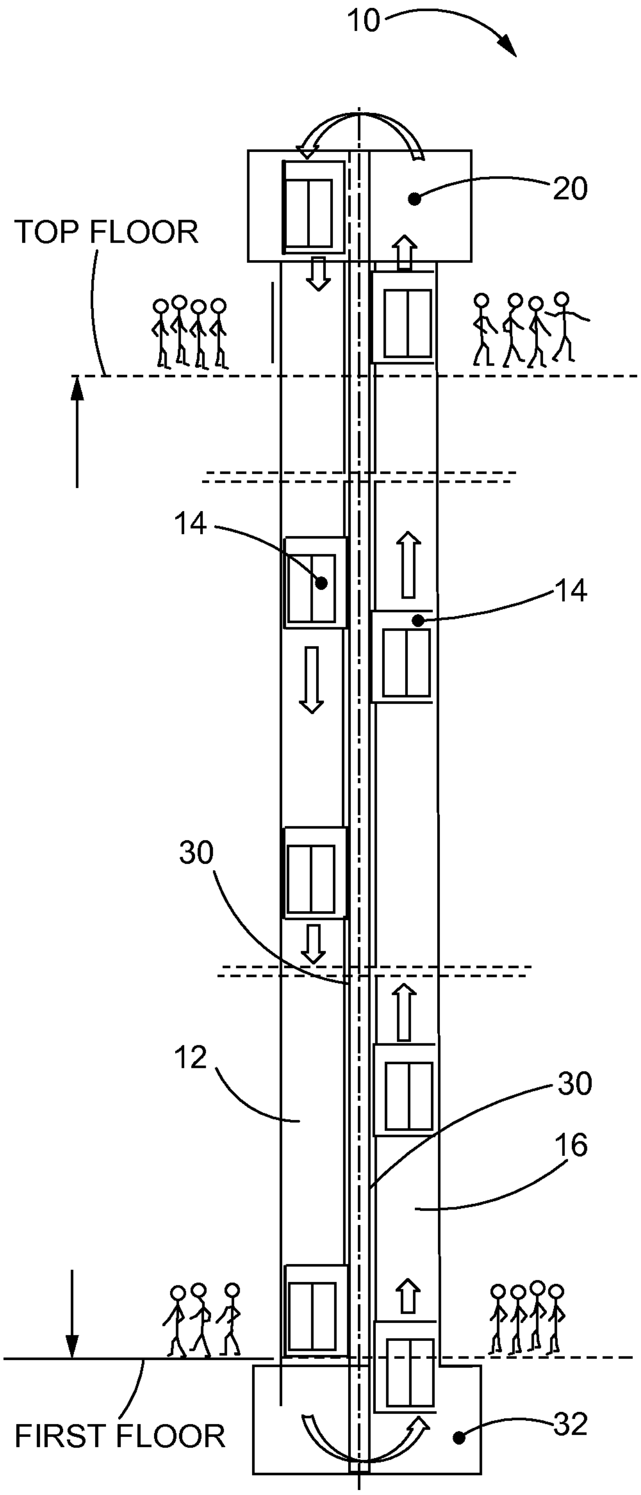
FIG. 1 is an embodiment of an exemplary elevator system.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling within the spirit and scope of the present disclosure.

DETAILED DESCRIPTION OF THE DISCLOSURE

The linear propulsion system 10 disclosed herein may be utilized in applications that require movement of a vehicle along a track. For example, the linear propulsion system may be utilized for elevators, trains, roller coasters, or the like.

To facilitate the understanding of this disclosure, the linear propulsion system will be described as utilized in a linear motor propelled elevator system. It is to be understood that the linear propulsion system is not intended to be limited to elevator applications. The elevator application described herein is an exemplary embodiment described in order to facilitate understanding of the disclosed propulsion system.

Referring now to FIG. 1, a propulsion system 10 is shown in schematic fashion. The propulsion system is an exemplary elevator system that utilizes one or more linear motors. As shown in FIG. 1, the elevator system 10 includes a first hoistway 12 provided vertically within a multi-story building. Elevator cars 14 may travel upward in the first hoistway. The elevator system 10 includes a second hoistway 16 in which elevator cars 14 may travel downward. Both the first and second hoistways may be disposed within an elevator shaft 18.

Elevator system 10 transports elevator cars 14 from a first floor to a top floor in the first hoistway 12 and transports elevator cars 14 from the top floor to the first floor in the second hoistway 16. Above the top floor may be an upper transfer station 20 where elevator cars 14 from the first hoistway 12 may be moved to the second hoistway 16. It is understood that the upper transfer station 20 may be located at the top floor, rather than above the top floor. Below the first floor is a lower transfer station 22 where elevator cars 14 from the second hoistway 16 may be moved to the first hoistway 12. It is understood that lower transfer station 22 may be located at the first floor, rather than below the first floor. Although not shown in FIG. 1, elevator cars 14 may stop at intermediate floors to allow ingress to and egress from an elevator car 14.

Figure 2:
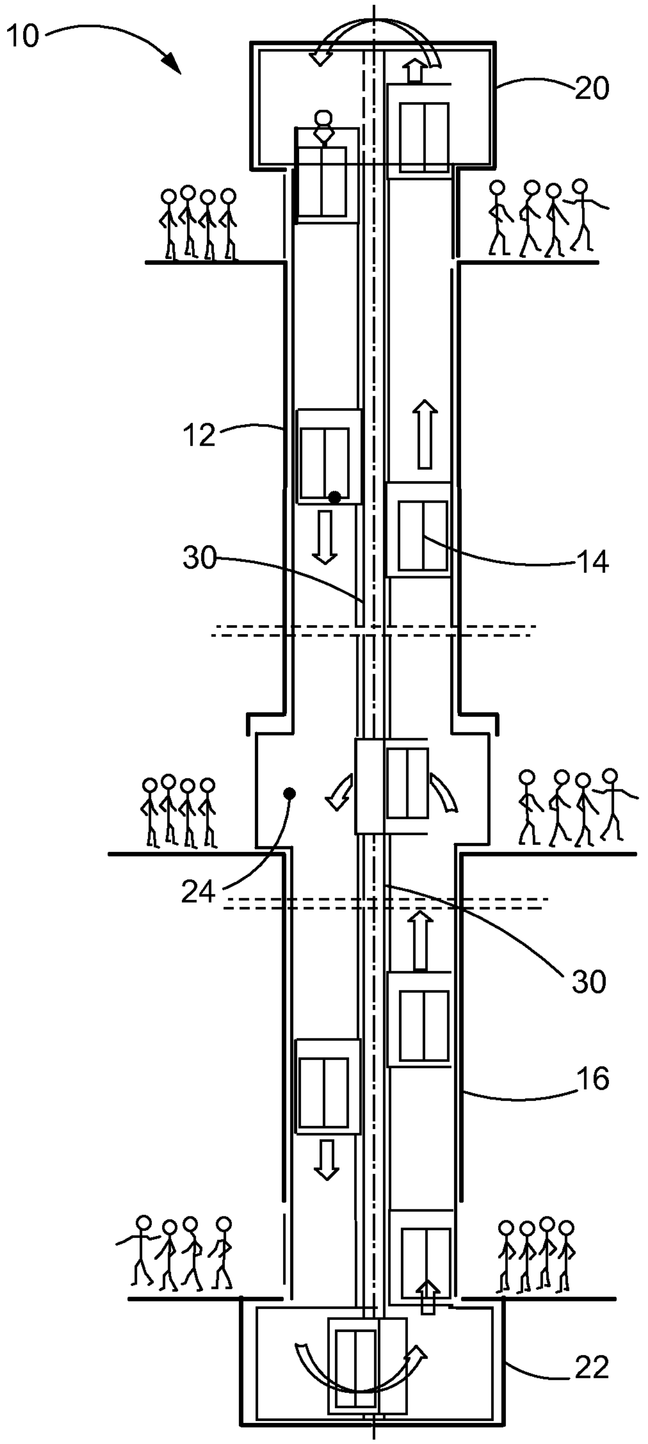
FIG. 2 is an another embodiment of an exemplary elevator system.

FIG. 2 depicts another exemplary embodiment of the elevator system 10. In this embodiment, the elevator system 10 includes an intermediate transfer station 24 located between the first floor and the top floor where the elevator car 14 may be moved from the first hoistway 12 to the second hoistway 16 and vice versa. Although a single intermediate transfer station 24 is shown, it is understood that more than one intermediate transfer station 24 may be used. Such an intermediate transfer may be utilized to accommodate elevator calls. For example, one or more passengers may be waiting for a downward traveling car 14 at a landing on a floor. If no cars 14 are available, an elevator car 14 may be moved from the first hoistway 12 to the second hoistway 16 at intermediate transfer station 24 and then moved to the appropriate floor to allow the passenger(s) to board. It is noted that elevator cars may be empty prior to transferring from one hoistway to another at any of the upper transfer station 20, lower transfer station 22, or intermediate transfer station 24. The elevator system 10 further comprises a track 30 disposed each hoistway.

Figure 3A:
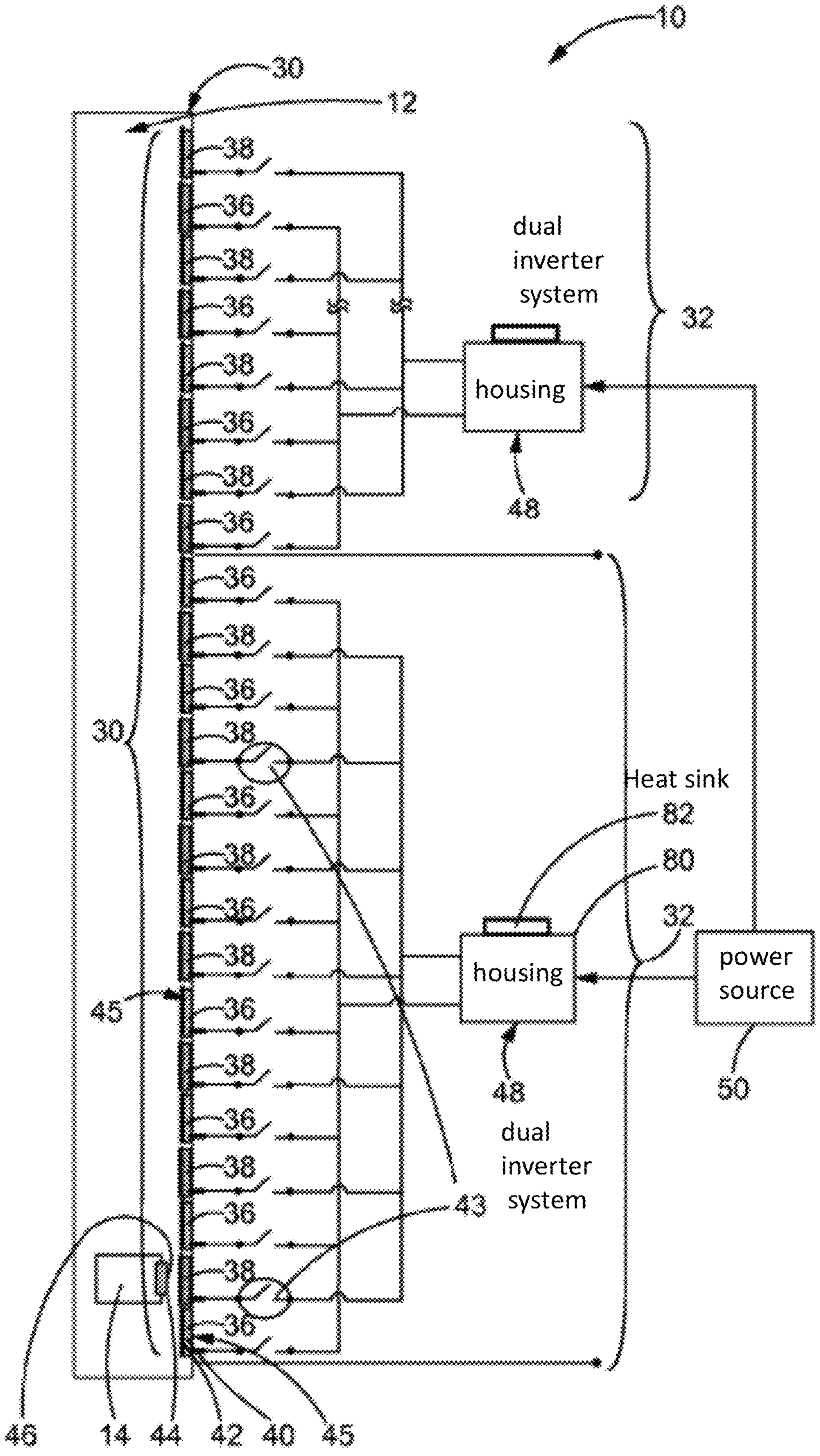
FIG. 3A is schematic drawing of one embodiment of a linear propulsion system in accordance with the teachings of this disclosure.

FIG. 3A illustrates an exemplary track 30 disposed in the first hoistway 12. The track 30 may comprise a plurality of segments 32. Each segment 32 may service a plurality of floors in a building. Each segment 32 may include a first plurality 36 of stator sections 45 interleaved with a second plurality 38 of stator sections 45. What is meant by the term interleaved is that the first stator section 45 on the track 30 is one of the first plurality 36 of stator sections, the next stator section 45 on the track 30 is one of the second plurality 38 of stator sections and so forth. Each stator section 45 may include a frame 40 and a plurality of coils 42 mounted on the frame 40. Each stator section 45 may have an activated state and a deactivated state. When the stator section 45 is activated, current is flowing to the stator coils 42 of the stator section 45. When the stator section 45 is in a deactivated state, current is not flowing to the stator coils 42 of the stator section 45.

Figure 3B:
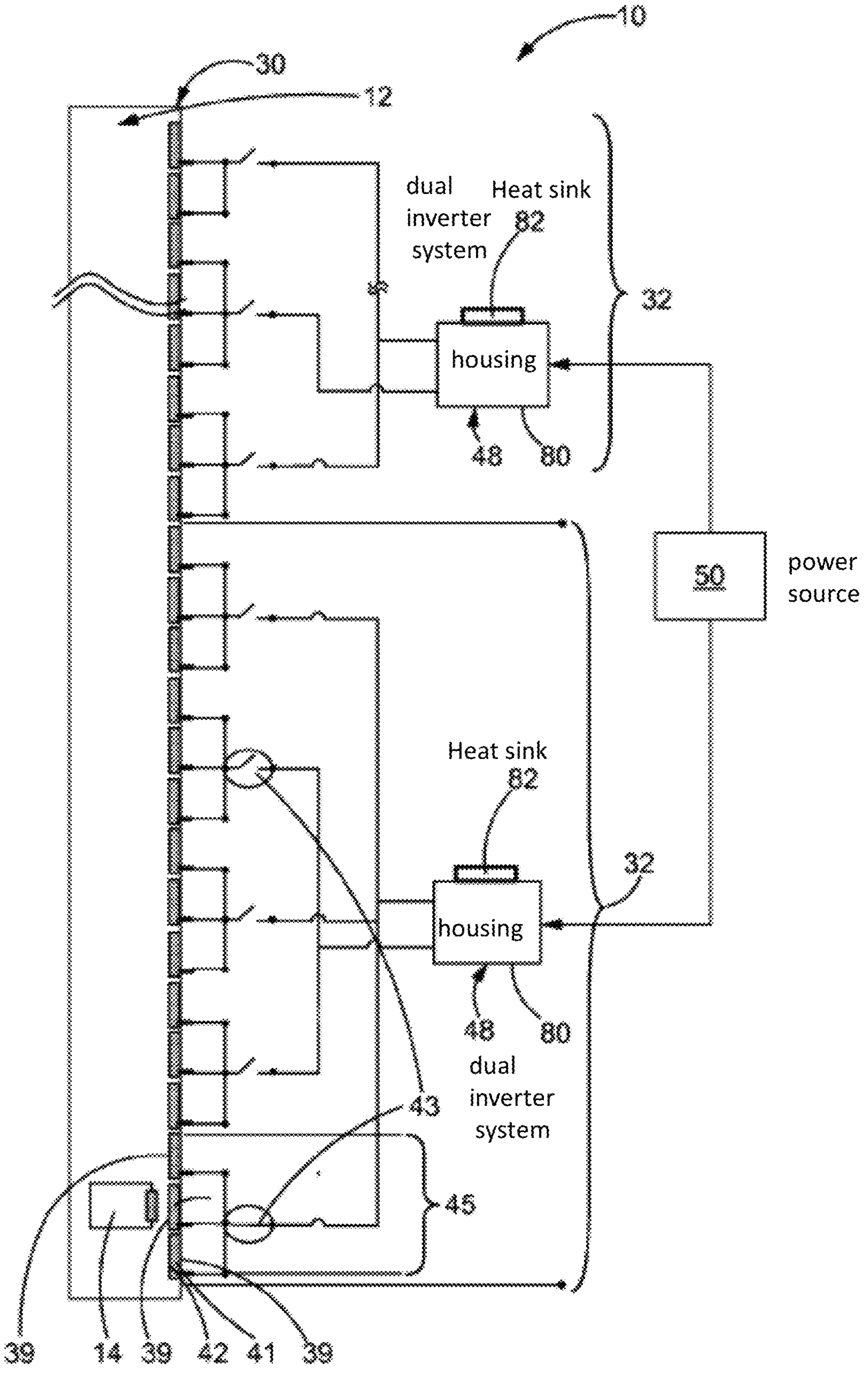
FIG. 3B is schematic drawing of another embodiment of a linear propulsion system in accordance with the teachings of this disclosure.

FIG. 3B illustrates another embodiment of an exemplary track 30 disposed in the first hoistway 12. It is similar to the track 30 described in FIG. 3A except that each stator section 45 includes a plurality of consecutive subsections 39. Each subsection 39 may include a subsection frame 41 and a plurality of coils 42 mounted to the frame 41. In the embodiment illustrated in FIG. 3B, the length of each subsection 39 is about the length of the stator section 45 in the embodiment illustrated in FIG. 3A.

The elevator system 10 may further comprise a plurality of switches 43 connecting the dual inverter system 48 to the stators 45. As shown in FIG. 3A, in one embodiment each switch may be in a one-to-one correspondence with each of the individual stator sections 45 in the plurality of stator sections 36, 38. In embodiments such as that illustrated in FIG. 3B, in which a stator section 45 has subsections 39, each switch 43 may be operably connected to a group of subsections 39. Each switch 43 is moveable between an open position and a closed position. When the switch 43 is in the closed position (and the inverter, as described later, is activated) the stator section 45 is activated.

As shown in FIGS. 3A-3B, the elevator system 10 may further comprise a mover 44 mounted to the elevator car 14 and disposed adjacent to the track 30. The mover 44 may include a plurality of magnets 46. In one embodiment, the magnets 46 may be permanent magnets. In one embodiment, the length of the mover 44 may be about the same or shorter than the length of a stator section 45. In another embodiment, the length of the mover 44 may be longer than one or more stator subsections 39 of a stator section 45 but shorter than the length of the stator section 45.

The elevator system 10 may further include a dual inverter system 48 connected to a power source 50 such as commercial utility power, or the like. The dual inverter system 48 is operably connected to one segment 32. In embodiments, with multiple segments 32, the elevator system 10 may comprise multiple dual inverter systems 48. In such embodiments, there may be one dual inverter system 48 per segment 32.

Figure 4:
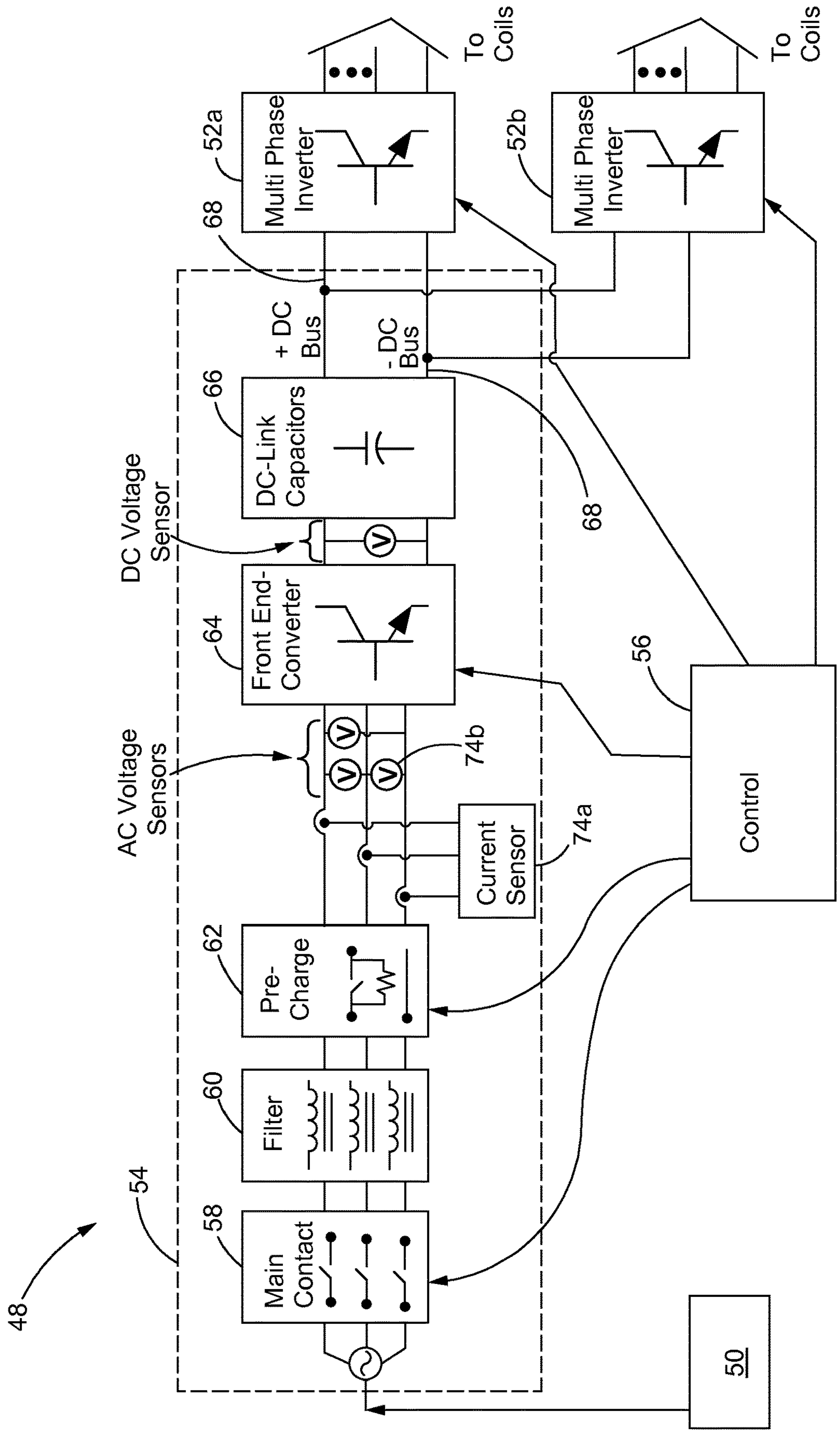
FIG. 4 is more detailed schematic of the duel inverter system.

Turning now to FIG. 4, therein is illustrated one exemplary embodiment of a dual inverter system 48. The dual inverter system 48 may include first and second multi-phase inverters 52*a*, 52*b*, input hardware 54, and a controller 56. The first multi-phase inverter 52*a* may be operably connected to the coils 42 of the first plurality of stator sections 36. The second multi-phase inverter 52*b* may be operably connected to the coils 42 of the second plurality of stator sections 38.

The input hardware 54 may be disposed between the power source 50 and each of the first and second multi-phase inverters 52*a*, 52*b*. The input hardware receives power input from the power source 50 and processes it prior to delivery to the first and second multi-phase inverters 52*a*, 52*b*. The input hardware 54 is common to (or shared by) the first and second multi-phase inverters 52*a*, 52*b*. This arrangement maximizes the utilization of the input hardware 54 because the input hardware 54 is processing power received from the power source 50 whenever a multi-phase inverter 52*a*, 52*b* is activated. In the context of an elevator system, whenever the car 14 is present in a segment 32, the input hardware 54 (of the dual inverter system 48 operably connected to the segment 32) is continuously operating. One advantage to such an arrangement is that as long as the car is in motion within a segment the hardware utilization will be about 95% to 100%, and the power utilization will be between about 50 to about 100% depending on the weight of the passengers. Power utilization is the percentage of rated power used when the hardware is utilized. The input hardware 54 and the first and second multi-phase inverters 52*a*, 52*b* may be enclosed within a housing 80 and may be connected to a common heat sink 82 (FIGS. 3A-3B).

As can be seen in FIG. 4, in one embodiment, the input hardware may include a main contact 58, one or more filters 60, a pre-charge circuit 62, a front end converter 64, a dc-link capacitor 66, and a DC bus 68. The main contact 58 is connected to the power source 50. An example of a power source 58 may be a power station of a utility, a power grid, power generator, battery, or the like. The contact 58 may be a switch that when closed connects remainder of the input hardware to the power source 50. The main contact 58 may be comprised of a plurality of such switches.

The filter 60 may be connected to the main contact 58 and may be an EMI filter or the like. The filter 60 reduces or removes electromagnetic interference such as harmonics, voltage ripple and the like from the power received from the power source 50.

The pre-charge circuit 62 may be connected to the filter 60 and serves to limit the initial current received by the front-end converter 64 and the multi-phase inverters 52*a*, 52*b* from the power source 50. One embodiment of the pre-charge circuit 62 may be a resister 70 in parallel with a relay 72. Once the capacitor in the multi-phase inverter 52*a*, 52*b* is initially charged, the relay substantially "removes" the resister 70 from the path of the current by closing the relay 72. When closed, most or substantially all of the current will flow through the relay 72 to the front-end converter 64 and only a very small amount will flow through the resister 70.

The front end converter 64 may be connected to the pre-charge circuit 62 and converts the received power from AC to DC for transmission over a DC bus.

A dc-link capacitor 66 may be disposed between the front-end converter 64 and the first and second multi-phase inverters 52*a*, 52*b*. The dc-link capacitor 66 may be utilized to protect the first and second multi-phase inverters 52*a*, 52*b* from momentary voltage spikes and surges and for filtering out AC power ripple. A DC bus 68 connects each multi-phase inverter 52*a*, 52*b* to the dc-link capacitor 66.

The first and second multi-phase inverters 52*a*, 52*b* convert the DC input received from the DC bus 68 into three-phase AC power with a frequency that is proportional to the speed of the elevator car 14.

In some embodiments, the input hardware may include sensors 74. In the embodiment illustrated in FIG. 4 the dual inverter system may include current sensors 74*a* and voltage sensors 74*b* between the pre-charge circuit 62 and the front end converter 64. In some embodiments, the dual inverter system may also include temperature sensors.

The controller 56 is operably connected to the first and second multi-phase inverters 52*a*, 52*b*, the main contact 58, the pre-charge circuit 62 and the front-end converter 64. The controller 56 may be programmed to sequence activation and deactivation signals to the first and second multi-phase inverters 52*a*, 52*b*. More specifically, the controller 56 may be a single digital signal processor or micro-controller based control board that generates the required gating signals to activate or deactivate the first and second multi-phase inverters 52*a*, 52*b*. In one embodiment, the dual inverter system 48 includes only a single controller 56 that generates signals for activation or deactivation of the first and second multi-phase inverters 52*a*, 52*b*. When the first multi-phase inverter 52*a* is activated by the controller 56, a first stator section 45 in the first plurality 36 is energized and the interaction between the mover 44 and the first stator section 45 generates a propulsion force on the car 14 in a vertical direction along the track 30. When the second multi-phase inverter 52*b* is activated by the controller 56, a second stator section 45 in the second plurality 38 is energized and the interaction between the mover 44 and the second stator section 45 generates a propulsion force on the car 14 in a vertical direction.

Also disclosed is a method of assembling and testing a linear propulsion system 10. The method may comprise providing the track 30, the vehicle or car 14, the mover 44 and the dual inverter system 48 discussed above, and sharing input hardware by the first and second multi-phase inverters 52*a*, 52*b*. The method may further include receiving, by the first multi-phase inverter 52*a*, power input from the common hardware 54, receiving, by the second multi-phase inverter 52*b*, power input from the common hardware 54, and sequencing, by the controller 56, the activation and deactivation signals to the first and second multi-phase inverters 52*a*, 52*b* to activate a first stator section 45 of the first plurality 36 of stator sections followed by activating a second stator section 45 of the second plurality 38 of stator sections. The second stator section 45 may be sequentially adjacent to the first stator section 45. The method may also comprise generating a propulsion force on the vehicle 14 in a direction along the track 30 when the first and second stator sections 45 are activated.

INDUSTRIAL APPLICABILITY

In light of the foregoing, it can be seen that the present disclosure sets forth a motor drive for a linear machine with distributed windings. In operation, while a mover on a vehicle is adjacent to a stator section, the controller activates the corresponding multi-phase inverter.

Initially, the main contact switch is activated by the controller and the dual inverter system is connected to the power source. The filter reduces or removes electromagnetic interference from the power received from the power source. Initially the relay is open in the pre-charge circuit to limit initial current received by the front-end converter and the multi-phase inverters from the power source. Once the capacitor in the multi-phase inverter is charged, the controller closes the relay in order to substantially remove the resistor from the path of the current. When closed, most or substantially all of the current will flow through the relay to the front-end converter where the power is converted from AC to DC. A dc-link capacitor may be used to protect the first and second multi-phase inverters from momentary voltage spikes and surges and for filtering out AC power ripple.

Figure 5:
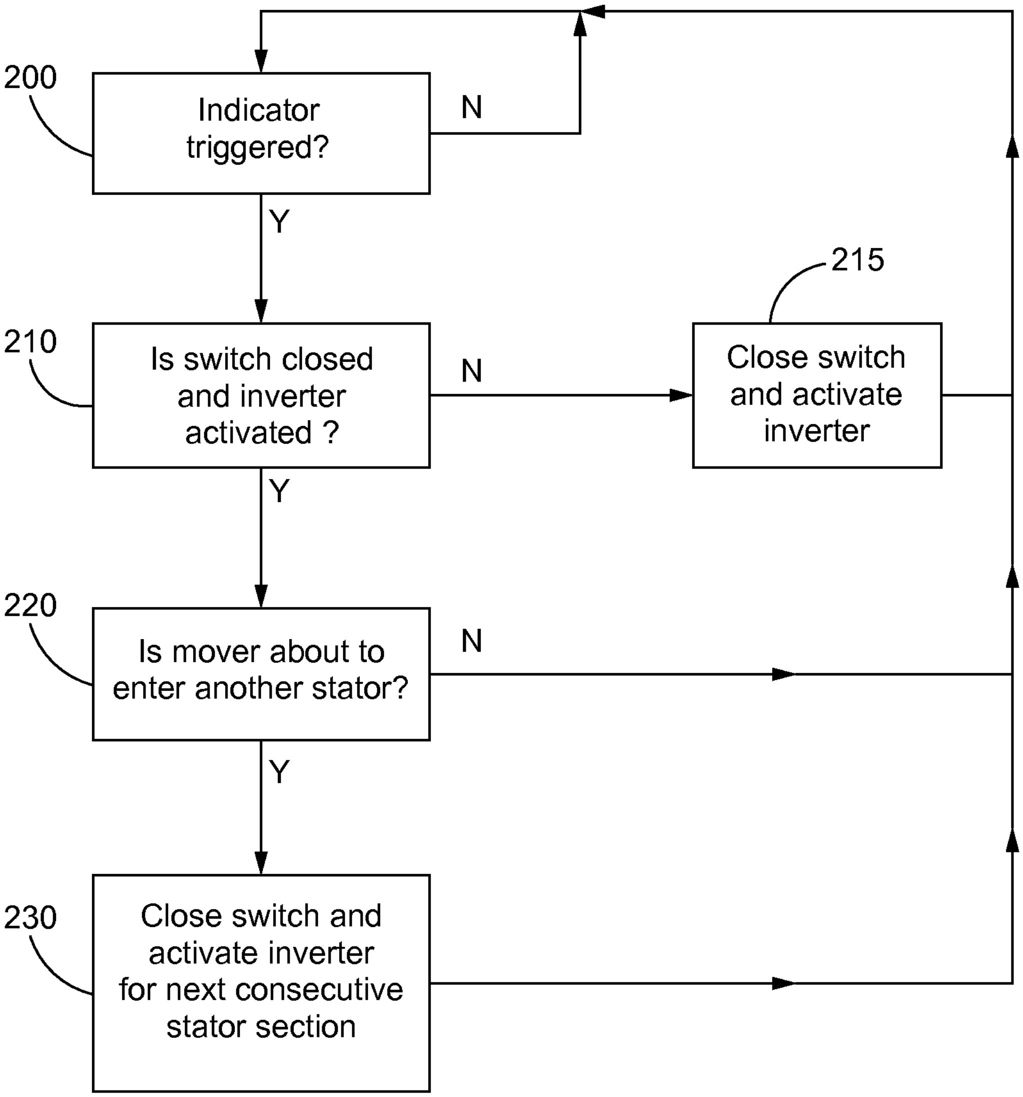
FIG. 5 is a process flow chart depicting a sample sequence of steps which may be practiced in accordance with the teachings of the present disclosure.

The controller is also configured to sequence the activation and deactivation signals to the first and second multi-phase inverters. FIG. 5 is a flow chart depicting an exemplary process for sequencing the activation and deactivation signals.

In block 200, the controller determines whether the mover has triggered a position indicator in a segment. The indicator may be triggered when the mover is adjacent to a particular stator section, for example, a first stator section. If so, the controller proceeds to block 210. If not, the process proceeds back to block 200.

In block 210, if the controller determines whether the switch between the dual inverter system and the stator section is already closed and the multi-phase inverter associated with that stator section already activated. If so, the process will proceed to block 220. If not, the process proceeds to block 215 where the switch is closed and the appropriate multi-phase inverter is activated. The process then proceeds back to block 200.

In block 220, the controller determines whether the mover is about to leave or enter another consecutive stator section (such as, for example, one of the second plurality of stator sections). If not, the process proceeds to block 200. If so, the process proceeds to block 230 where the switch is closed for the next consecutive stator section and the multi-phase inverter associated with that stator section is activated.

In some embodiments, when power is received from the first multi-phase inverter, one of the first plurality of stator sections may activated but none of the second plurality of stator sections may be activated. Similarly, when power is received from the second multi-phase inverter, one of the first plurality of stator sections may be activated but none of the second plurality of stator sections may be activated. In other embodiments, a stator section in the first plurality and the second plurality may be activated at the same time. For example, in some embodiments, the next consecutive stator section may be activated in preparation for when the mover enters or become adjacent to the stator section. In some embodiments, the stators do not have subsections and every other stator may be activated serially. In other embodiments, the stators may comprise a plurality of subsections and one or more of the subsections may be activated at the same time. Further, in some embodiments, one or more stator subsections in a first stator section may be activated at the same time as one or more stator subsections in the next consecutive stator section. For example, there may be rolling activation of a quantity of subsections (for example, three subsections) as the vehicle proceeds along the track. Those subsections may be in different stator sections or segments (two may be in a first stator section and one subsection may be in a second stator section).

The motor drives described herein reduce position signal latency for improved hand-off performance due to the use of common control as opposed to two discrete multi-phase invertors. Reduction of inverter volume due to decrease in inverter component count and the use of a common housing, heat sink and mounting hardware is another benefit. Hardware utilization is improved since the front end components are continuously processing power when the vehicle is present within a stator segment.

While only certain embodiments have been set forth, alternatives and modifications will be apparent from the above description to those skilled in the art. These and other alternatives are considered equivalents and within the spirit and scope of this disclosure.

What is claimed is:

1. A linear propulsion system comprising:
a track comprising a first plurality of stator sections and a second plurality of stator sections, the second plurality interleaved between the first plurality, each stator section including frame and a plurality of coils mounted on the frame, each stator section having an activated state and a deactivated state;
a vehicle;
a mover functionally mounted to the vehicle and disposed adjacent to the track, the mover including a plurality of magnets; and
a dual inverter system operably connected to each of the stator sections, the dual inverter system including:
first and second multi-phase inverters, the first inverter operably connected to the first plurality of stator sections, the second inverter operably connected to the second plurality of stator sections; and
a controller operably connected to the first and second multi-phase inverters,
wherein a propulsion force on the vehicle is generated when the mover is adjacent to one or more of the stator sections in the activated state.

2. The system of claim 1, wherein a length of the mover is about the same or shorter than the stator section.

3. The system of claim 1, in which the mover includes permanent magnets.

4. The system of claim 1, in which stator section includes a plurality of subsections arranged consecutively, each subsection including a plurality of coils, wherein a length of the mover is longer than each subsection but shorter than the stator section.

5. The system of claim 1, in which the dual inverter system further includes input hardware shared by and operably connected to the first and second multi-phase inverters.

6. The system of claim 5, in which the input hardware includes a filter.

7. The system of claim 5, in which the input hardware includes a pre-charge circuit that limits the initial current received by the first and second inverters from a power source.

8. The system of claim 5, in which the input hardware includes an AC to DC converter.

9. The system of claim 5, in which the input hardware includes a DC-link capacitor.

10. An elevator system comprising:
the linear propulsion system of claim 1;
wherein the vehicle comprises a car;
input hardware disposed between a power source and each of the first and second multi-phase inverters, the input hardware shared by the first and second multi-phase inverters; and
wherein when the first inverter is activated, a first stator section in the first plurality is energized and the interaction between the mover and the first stator section generates a propulsion force on the car in a vertical direction, and when the second inverter is activated, a second stator section in the second plurality is energized and the interaction between the mover and the second stator section generates a propulsion force on the car in a vertical direction.

11. The elevator system of claim 10, wherein, during propulsion of the car in a segment, the hardware utilization of the input hardware is in the range of about 95% to 100%.

12. The elevator system of claim 10, in which each stator section includes subsections, wherein a length of the mover is longer than each individual subsection.

13. The elevator system of claim 10, in which the input hardware includes sensors.

14. The elevator system of claim 10, wherein, when power is received from the first multi-phase inverter, a first stator section of the first plurality is activated but none of the second plurality of stators sections is activated.

15. The elevator system of claim 10, wherein, when power is received from the second multi-phase inverter, a second stator section of the second plurality is activated but none of the first plurality of stator sections is activated.

16. The elevator system of claim 10 further comprising a plurality of switches in a one-to-one correspondence with each of the stator sections, each switch disposed between the dual inverter system and one of the stator sections, each switch moveable between an open position and a closed position, wherein when the switch is in the closed position, the stator section is activated.

17. The elevator system of claim 10, wherein the mover includes permanent magnets.

18. The elevator system of claim 10, wherein the length of the mover is the same or shorter than each stator section.

19. The elevator system of claim 10, wherein each stator section comprises three subsections.

* * * * *